Dec. 2, 1924.

F. A. BOWER

WHEEL

Filed May 11, 1921

1,517,821

Inventor
Ferdinand A. Bower
By his Attorneys
Blackmore, Skinner & Flint

Patented Dec. 2, 1924.

1,517,821

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

WHEEL.

Application filed May 11, 1921. Serial No. 468,764.

*To all whom it may concern:*

Be it known that I, FERDINAND A. BOWER, a citizen of the United States, and a resident of Flint, county of Genesee, and State of Michigan, have invented certain new and useful Improvements in Wheels, of which the following is a full, clear, concise, and exact description, such as will enable others skilled in the art to which the invention relates to make and use the same, reference being made therein to the accompanying drawings, which form a part of this specification.

This invention relates to wheels and more particularly to metallic wheels for motor vehicles.

One of the objects of the invention is the elimination of wooden spokes and fellies and making the entire wheel of metal.

Another object of the invention is the provision of improved means for efficiently bracing the rim supporting member of the wheel.

Another object of the invention is the production of an improved wheel that is light, strong and durable, simple in construction, cheap to manufacture, easily assembled, and that is not likely to get out of order.

Still another object of the invention is so arranging the parts that the conventional form of hub may be utilized in the construction of the wheel.

Other and further objects and advantages of the invention will appear as the description proceeds.

Figures 1, 2:
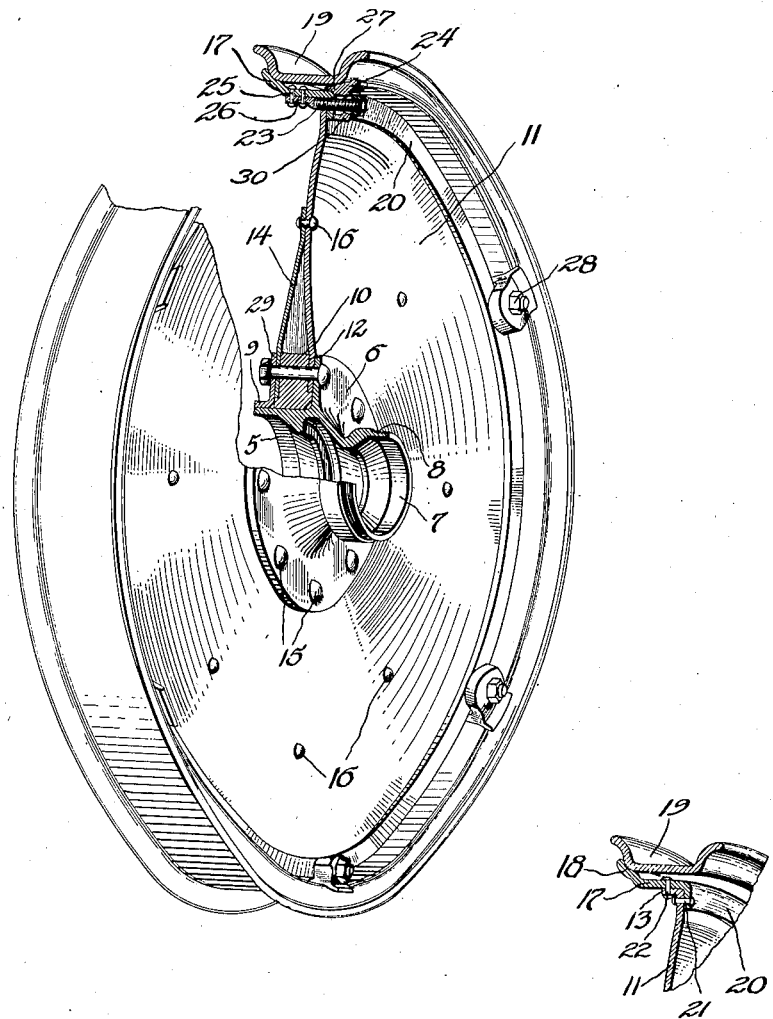
Figure 1 is a perspective view of the wheel with parts in section and parts broken away.
Figure 2 is a section in perspective of a portion of the outer edge of the wheel.

On the drawing, the reference numeral 5 designates a hub which may be, and preferably is, of the type now employed in connection with wooden spokes and fellies. This hub is provided on its outer end with the radially extending hub flange 6. The outer end of the hub is also provided with the outwardly extending projection 7 which may be screw-threaded as at 8 for the reception of the hub cap, not shown. An annular hub flange 29 which may be provided with an inwardly extending portion 9 is detachably mounted on the inner end of the hub 5. An annular spacing member 10 is positioned on the hub between the flanges 6 and 29.

A rim supporting member 11 is adapted to have its inner edge seated in a recess 12 formed in the side face of the spacing member 10, the parts being so arranged that the flange 6 will be in contact both with the rim supporting member 11 and the spacing member 10. The rim supporting member may be, and preferably is, in the form of a metallic annular disc or plate having the laterally extending flange 13 at its outer periphery.

A bracing member 14 is provided for bracing the rim supporting member 11 against lateral thrusts. This member may be in the form of an annular disc having a radius substantially less than the radius of the rim supporting member 11 and has its inner periphery seated in a recess in the inner side face or portion of the spacing member 10. This recess is of the same depth as the thickness of the rim supporting member, whereby the flange 29 is in contact both with the spacing member 10 and with the inner peripheral edge of said bracing member. The flange 6, rim supporting member 11, spacing member 10, bracing member 14 and inner flange 29 are adapted to be held in a rigid assembled relation by means of fastening members such as the bolts 15.

The rim supporting member 11 and the bracing member 14 are adapted to converge outwardly and are secured together at the outer peripheral edge of the bracing member 14 by any suitable means such as rivets 16.

A metallic band or rim 17 is seated on the flange 13. The form or shape of this band or rim will depend on whether a demountable rim is to be employed therewith, or whether the pneumatic tire is to be mounted directly on this band. As shown, however, a demountable rim is employed in connection therewith. The band, rim or felly 17 has its body portion resting on the flange 13 and is secured thereto in any suitable manner as by means of the rivets 22. The inner edge of the band or rim 17 extends laterally and outwardly to form the inclined surface 18 on which the inner edge of the rim 19 is adapted to seat. The outer edge of the band or rim 17 is bent radially inwardly to form the flange 20 (see Figure 2) which is secured to the rim supporting member 11 by suitable means, as rivets 21.

The demountable rim 19 is adapted to be secured in position on the band or rim 17 by any suitable retaining means such as the bolts 23 and wedges 24. The bolts 23 are rigidly secured to the band or rim 17 by any suitable means, such as rivets 25, which pass through the body thereof and engage flattened portions 26 of the bolts 23. The bolts 23 extend laterally outwardly through the flange 20. The wedges 24 having the fulcrums 30 which engage the flange 20 are provided with the wedge portions 27 that are adapted to be forced between the outer edge of the rim 19 and the felly 17 by means of the nuts 28 to force the demountable rim laterally and radially against the inclined surface 18 to firmly secure the same in operative position. Attention is directed to the fact that the fulcrum 30 of the wedges 24 are protected from engaging, and consequently indenting, or otherwise injuring, the face of the rim supporting member 11. Moreover, the two thicknesses of the sheet metal form a firm, non-resilient abutment against which the fulcrums of the wedges may engage and hence the wedges can be forced more efficiently beneath the demountable rim to secure the same in operative position on the wheel.

While I have shown and described only a single embodiment of my invention, it is understood that various changes in the size, shape, form, proportions and minor details therof, may be made without departing from the spirit or scope of the invention, as set forth in the following claims.

I claim:—

1. A wheel comprising, in combination, a supporting disk, a felly band, and means securing the disk and band permanently together, the band extending over and resting on the disk in such a manner as to prevent shearing strain on said means due to radial loads and having an inwardly-extending flange overlapping the opposite side surface of the disk, which flange is engaged by said means.

2. A wheel comprising, in combination, a supporting disk having a laterally-extending flange about its periphery, and a band of L-shaped cross section one portion of which rests on the flange of the disk and the other portion of which constitutes an inwardly-extending flange overlapping the side of the disk.

3. A wheel comprising, in combination, a ring-shaped spacing member of substantially rectangular cross-section which is rabbeted on opposite sides from its outer edge, annular disk members having their inner edges seated in the rabbeted portions on opposite sides of the spacing member and receiving radial loads from the bottoms of the rabbeted portions of the spacing member, a hub extending through the opening in the spacing member and having a flange overlapping one side of the spacing member and the corresponding disk member, a separate flange on the opposite end of the hub and overlapping the other side of the spacing member and the other disk member, and means for securing the flanges and the disk members and the spacing member together.

4. In a wheel, a hub, a supporting member secured to said hub, said supporting member being provided with a lateral flange on its outer peripheral edge, a felly band secured to said flange, said felly band being provided with an inturned flange engaging the outer face of the peripheral edge of said supporting member and means for securing said inturned flange and said supporting member together, substantially as shown and described.

In testimony whereof I affix my signature.

FERDINAND A. BOWER.